(12) United States Patent
Eveley

(10) Patent No.: US 8,622,406 B2
(45) Date of Patent: Jan. 7, 2014

(54) TRAILING BEAM MOUNTING AND ALIGNMENT APPARATUS

(76) Inventor: Nicholas Eveley, Stoney Creek (CA)

( * ) Notice: Subject to any disclaimer, the term of this patent is extended or adjusted under 35 U.S.C. 154(b) by 25 days.

(21) Appl. No.: 13/350,210

(22) Filed: Jan. 13, 2012

(65) Prior Publication Data

US 2013/0181422 A1   Jul. 18, 2013

(51) Int. Cl.
  *B60G 9/02*    (2006.01)
  *B60G 3/12*    (2006.01)
  *B60G 21/05*   (2006.01)
  *B60G 7/00*    (2006.01)
  *B62D 17/00*   (2006.01)

(52) U.S. Cl.
  USPC ...... 280/124.121; 280/124.116; 280/124.128; 280/124.153; 280/86.75; 280/86.751; 280/86.754

(58) Field of Classification Search
  USPC ............ 280/124.121, 124.116, 124.128, 280/124.153, 86.75, 86.754, 86.751
  See application file for complete search history.

(56) References Cited

U.S. PATENT DOCUMENTS

| | | | | |
|---|---|---|---|---|
| 3,231,040 A * | 1/1966 | Blanchette | ........ | 280/86.75 |
| 4,267,896 A * | 5/1981 | Hendriksen | ........ | 280/86.75 |
| 4,736,964 A * | 4/1988 | Specktor | ........ | 280/86.75 |
| 4,982,977 A * | 1/1991 | Shimada | ........ | 280/86.753 |
| 5,104,141 A * | 4/1992 | Grove et al. | ........ | 280/86.753 |
| 5,171,036 A * | 12/1992 | Ross | ........ | 280/124.116 |
| 6,302,416 B1 * | 10/2001 | Schmack | ........ | 280/93.512 |
| 6,409,189 B1 * | 6/2002 | Orimoto et al. | ........ | 280/86.751 |
| 6,550,795 B1 * | 4/2003 | Schlosser et al. | ........ | 280/86.75 |
| 7,267,348 B1 * | 9/2007 | Klein et al. | ........ | 280/124.128 |
| 7,296,809 B2 * | 11/2007 | Zebolsky | ........ | 280/86.75 |
| 7,331,588 B2 * | 2/2008 | Johnson | ........ | 280/86.754 |
| 8,469,375 B2 * | 6/2013 | Frens | ........ | 280/86.753 |
| 2006/0181043 A1 * | 8/2006 | Zebolsky | ........ | 280/86.75 |
| 2008/0036167 A1 * | 2/2008 | Svartz et al. | ........ | 280/124.116 |

* cited by examiner

*Primary Examiner* — Joseph Rocca
*Assistant Examiner* — Joselynn Y Sliteris
(74) *Attorney, Agent, or Firm* — Harness, Dickey & Pierce, P.L.C.

(57) ABSTRACT

The present invention provides an eccentric pivot member for effecting fore and aft movement of a leading end of a trailing beam member of a trailing beam suspension in response to rotation of the pivot member. Ratchet collars are provided which act between the eccentric pivot member and a suspension hanger to mechanically secure the assembly against rotation and any associated inadvertent misalignment.

7 Claims, 4 Drawing Sheets

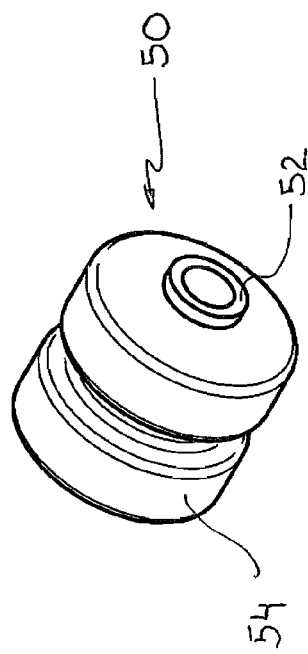
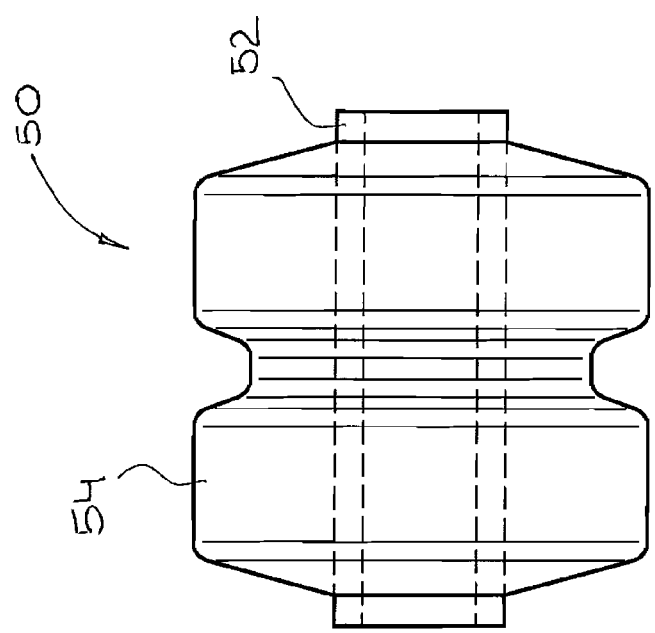
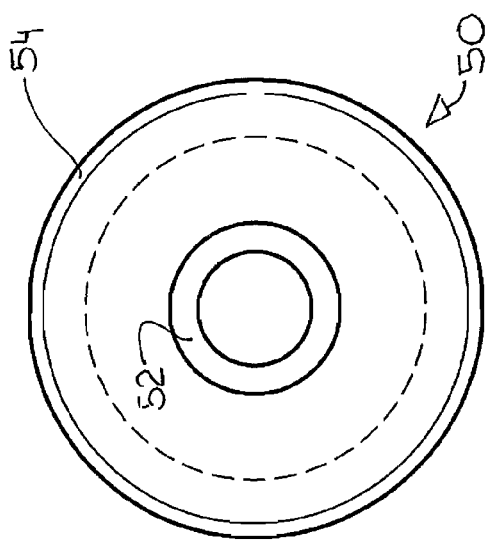

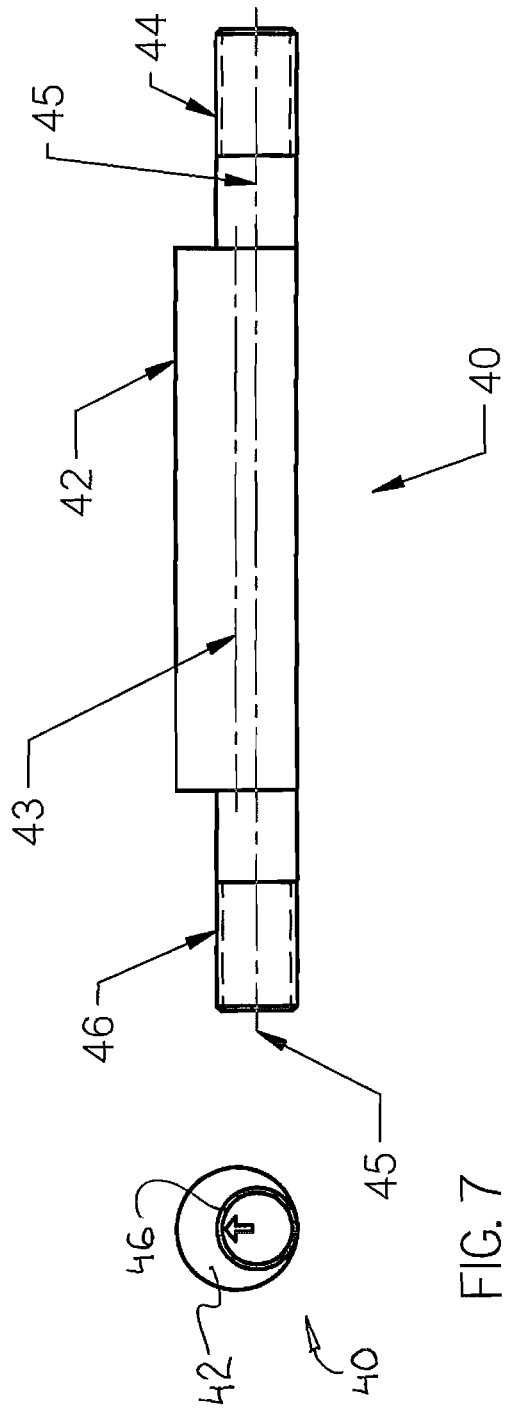

TRAILING BEAM MOUNTING AND ALIGNMENT APPARATUS

FIELD OF THE INVENTION

The present invention relates generally to vehicle suspension assemblies. More particularly, the invention relates to axle mounting assemblies for trailers. Still more particularly the present invention relates to alignment apparatus for a trailing beam hanger assembly.

BACKGROUND OF THE INVENTION

A trailing beam suspension typically utilizes a beam having a leading end opposite a trailing end. The beam is mounted lengthwise to a hanger at its leading end for swinging movement about an axis transverse to a trailer. The hanger is typically secured to a chassis or frame of the trailer by suitable means such as welding. A suspension unit such as an air bag extends between the trailing end of the beam and the chassis of the trailer. An axle is mounted to the beam transverse to the beam between the leading and trailing ends of the beam.

The above suspension arrangement is referred to as a "trailing beam" suspension because the beam extends rearwardly from its connection to the hanger and accordingly the axle "trails" the pivot point of the suspension system.

In assembling a trailer, there is a need, because of manufacturing tolerances, to provide for some fore and aft adjustment of the axle relative to the hanger to ensure that the axle is orthogonal to a centre line of the trailer. In its simplest form, the adjustment may simply be effected by providing slots in the hangers for receiving a pivot member about which the beam swings to enable fore/aft movement of the pivot member during assembly subsequent to which the components may be secured by friction (bolting), welding or both.

A disadvantage with simply providing a slot to enable movement is that it lacks apparatus for effecting the movement. Accordingly, external force needs to be applied to the beam or the axle to move the pivot member fore and aft. This makes minute adjustments somewhat difficult.

Screw type adjusters which act between the pivot member and the hanger have been proposed, however, such adjusters must be made quite robust and as well, the hanger suitably braced, for such to be effective. In any case, the screw generally cannot be relied upon to control fore/aft movement and accordingly, absent welding the components in place after adjustment, there is a risk of movement of the pivot member in the slot and ensuing misalignment.

Its is an object of the present invention to provide a trailing beam hanger and alignment apparatus which overcomes at least some of the problems associated with prior devices.

SUMMARY OF THE INVENTION

The present invention provides an eccentric pivot member for effecting fore/aft movement of the leading end of the beam in response to rotation of the pivot member. Ratchet collars are provided to mechanically secure the assembly against rotation and any associated inadvertent misalignment.

More particularly, a mounting and alignment apparatus is provided for a trailing beam hanger having walls at least partially defining a box with an opening for receiving a leading end of the trailing beam. The hanger is securable to a trailer with the opening facing in a rearward direction. The walls include a pair of spaced apart sidewalls for receiving the leading end of the trailing beam therebetween. The apparatus includes an eccentric pivot bolt having a center section between threaded, generally coaxial end sections. The center section is larger in diameter than the end sections and has a center section axis generally parallel to but non-coaxial with an axis of the end sections. The center section of the eccentric pivot bolt is receivable in a rigid center tube of a bushing mounted in a passage extending transversely through the leading end of the trailing beam. A first ratchet collar extends about and is secured to one of the end sections. The first ratchet collar has a flange extending through the passage to abut the center tube. A second ratchet collar is rigidly secured to the eccentric pivot bolt. The second ratchet collar has a grippable portion associated therewith for facilitating rotation of the second ratchet portion along with the eccentric pivot bolt about the axis of the end section. The first and second ratchet collars engage each other to provide at least unidirectional rotation of the second ratchet collar relative to the first ratchet collar. A hanger side reinforcement extends about the other of the end sections, the hanger side reinforcement has a raised collar for extending through an adjacent of the thrust washers to abut against the center tube. A nut threadedly engages the other of the end sections for acting against the hanger side reinforcement to urge the first and second ratchet collars toward each other to secure the ratchet collars and in turn the pivot bolt against rotation.

The apparatus may include a spring extending between the nut and the hanger side reinforcement.

A washer may extend between the nut and the spring.

The spring may be one or more disc springs.

The grippable portion may be a nut welded to the second ratchet collar.

The center tube is surrounded by a resilient material to provide cushioning between the hanger and the beam.

The first and second ratchet collars may have teeth which mesh with each other and which are profiled to cause unidirectional rotation corresponding with a tightening direction of the nut to restrain the ratchet collars from moving relative to each other in such a manner as to cause loosening of the components of the apparatus.

DESCRIPTION OF DRAWINGS

These and other features of the invention will become more apparent from the following description in which reference is made to the appended drawings wherein:

FIG. 3 is a perspective view of one of multiple bushing types that may be used with various suspension models;

FIG. 4 is a front elevation of the bushing of FIG. 3;

FIG. 5 is an end elevation of the bushing of FIG. 3;

FIG. 6 is a front plan view of an eccentric pivot bolt according to the present invention; and, FIG. 7 is an end elevation corresponding to FIG. 6.

DESCRIPTION OF PREFERRED EMBODIMENTS

Figure 1:
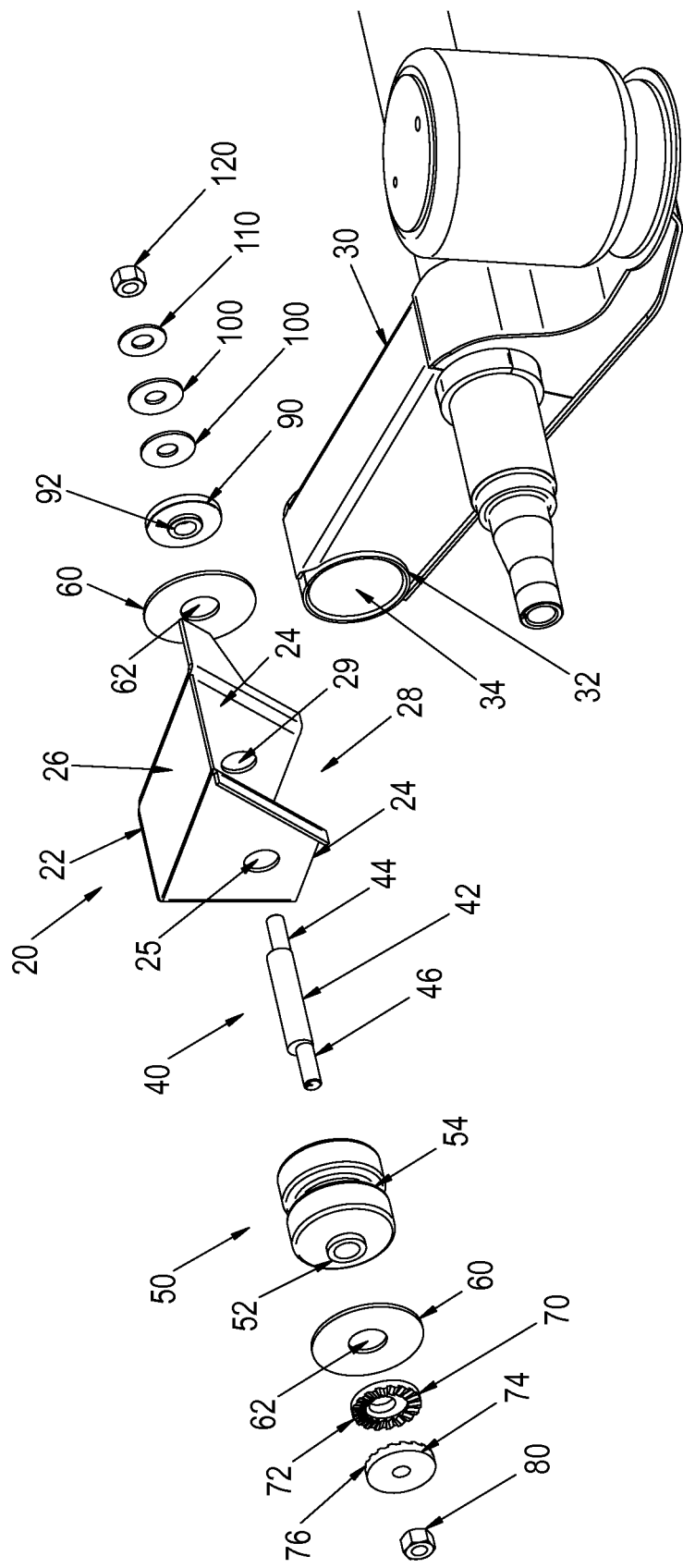
FIG. 1 is a view of a trailing beam incorporating a mounting and alignment apparatus according to the present invention.
Figure 2:
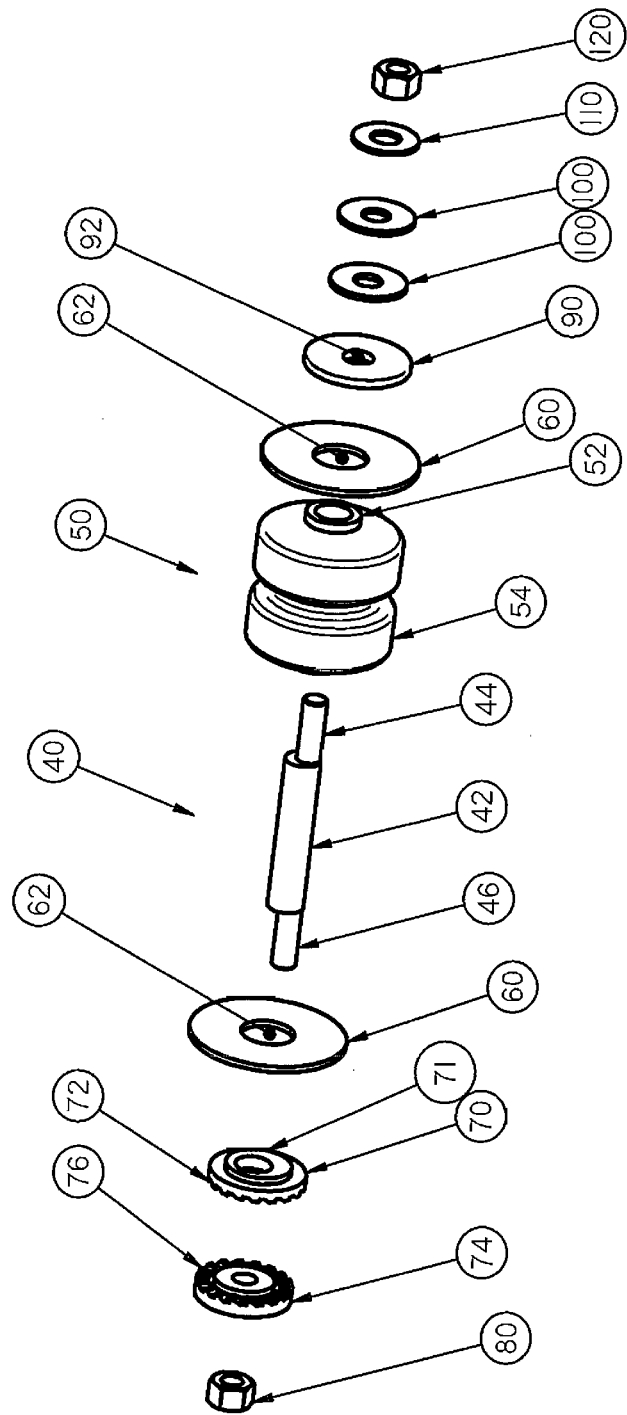
FIG. 2 is an exploded view of the mounting and alignment apparatus of FIG. 1.

A trailing beam mounting alignment apparatus according to the present invention is generally indicated by reference 10 in the accompanying illustrations. The apparatus 10 includes a hanger 20 having a forward wall 22, opposite sidewalls 24 and an upper wall 26 which partially define an opening 28 which receives a leading end 32 of a trailing beam 30. The leading end 32 is mounted between the sidewalls 24 and supported thereby.

An eccentric pivot bolt 40 mounts the trailing beam 30 to the hanger. The pivot bolt 40 is insertable through an opening 25 in one of the sidewalls 24. The pivot bolt 40 has a center section 42 between two end sections 44 and 46. The two end sections 44 and 46 are threaded and generally coaxial with each other. The center section 42 has an axis 43 which is generally parallel to a common axis 45 of the end sections 44 and 46 and its axis would revolve about the axis 45 of the end sections in response to rotation of the end sections 44 and 46 about their axis 45. In response, the axis 43 of the center section 42 can move fore and aft of the axis 45 of the end sections.

The leading end 32 of the trailing beam 30 has a transversely extending passage 34 which receives a bushing 50. The bushing 50 typically has a resilient shell 54 of an elastometric material surrounding a rigid tubular, typically steel, center tube 52. The center tube 52 in turn receives the center section 42 of the pivot bolt 40. The bushing 50 both mounts the leading end 32 to the hanger 20 and isolates the hanger from road shock transmitted along the trailing beam 30.

Respective wear discs 60 extend about the end sections 44 and 46 on opposite sides of the leading end 32 of the trailing beam 30. The wear discs 60 have an opening 62 having a diameter at least as large as the ends of the center tube 52 of the bushing 50 so as not to interfere with the center tube 52.

A first ratchet collar 70 extends about the end section 46 of the pivot bolt 40 adjacent an outer face of one of the sidewalls 24, to which it is secured (welded). The first ratchet collar 70 has a flange 71 extending through opening 25 in the adjacent sidewall 24 to abut bushing 50. The first ratchet collar 70 has outwardly facing teeth 72. A second ratchet collar 74 is mounted over the same end section 46 as is the first ratchet collar 70. The second ratchet collar has inwardly facing teeth 76 which face and engage with the outwardly facing teeth 72 of the first ratchet collar 70. The first and second ratchet collars, 70 and 74 respectively, fit closely over the end section 46. The flange 71 fits closely within the opening 62.

The second ratchet collar 74 may be welded to a nut 80 which is in turn welded to the end section 46. The nut 80 provides a grippable portion associated with the second ratchet collar 74 to facilitate co-rotation of the pivot bolt 40 and the second ratchet collar 74. Other arrangements are no doubt possible, such as, providing facets on the second ratchet member 74 or welding the nut to the pivot bolt 40 directly without welding it to the second ratchet member 74. Basically, what is desired is some provision to facilitate rotation of the pivot bolt, preferably using a simple tool, such as a wrench.

The teeth 72 and 76 of the first and second ratchet collars 70 and 74 respectively are preferably configured to allow rotation of the first and second ratchet collars relative to each other in a tightening direction and to block rotation in the opposite, loosening direction. As discussed below, such an arrangement ensures against loosening of the apparatus.

A hanger side reinforcement 90 is welded to the sidewall 24, aligning passage 92 with opening 29 in hanger sidewall. The hanger side reinforcement 90 is a cylindrical disc having a passage 92 therethrough for receiving the end section 44. The opening in the sidewall 25 should be large enough to admit the end section 44 of the pivot bolt 40 therethrough. The opening in the hanger would typically be sized to closely receive the end section 44 it surrounds to constrain the end section 44 against fore and aft movement (toward and away from the forward wall 22). Accordingly, rotation of the end sections 44 & 46 about their axes will result in fore and aft movement of the center section 42 and in turn, fore and aft movement of the trailing beam 30.

One or more disc springs 100 are mounted over the end section 44 outboard of the hanger side reinforcement 90. Two are illustrated. Resilient means other than a disc spring may be workable. The disc springs 100 should, preferably in an uncompressed state, allow enough axial movement of the pivot bolt 40 to enable the teeth of the first and second ratchet members, 70 and 74 respectively, to move into and out of meshing engagement.

A washer 110 and locknut 120 complete the assembly. The washer 110 mounts over the end section 44, engages the disc spring 100 on one side and is engaged by the locknut 120 on its opposite side. The locknut 120 threadedly engages the end section 44. Tightening the locknut 120 causes the disc springs 100 to be compressed into a collapsed configuration and urges the first and second ratchet collars, 70 and 74 respectively, toward each other to lock the pivot bolt 40 against rotation. Preferably the teeth 72 and 76 of the first and second ratchet collars 70 and 74 respectively are configured (profiled) to block rotation in the loosening direction of the pivot bolt 40 and locknut 120, assembly. The trailing beam 30 should be firmly mounted in the hanger 20 without binding and without excessive side-play. Accordingly, the amount of clamping force applied to the center tube 52 of the bushing 50 should be controlled, for example, by having the flange 71 and the sidewalls 24 abut against respective ends of the center tube 52 of the bushing 50. Assuming the flange 71 and sidewalls 24 are correctly dimensioned, the spring washers 100 and the hanger side reinforcement 90, which is welded to hanger side 24 and the tightening of the locknut 120 compresses the center tube 52 against the ratchet collar 70 and the hanger sidewall 24.

The invention claimed is:

1. A mounting and alignment apparatus for a trailing beam hanger having walls at least partially defining a box with an opening for receiving a leading end of the trailing beam, said hanger being securable to a trailer with said opening facing in a rearward direction, said walls including a pair of spaced apart sidewalls for receiving said leading end of said trailing beam therebetween, said apparatus comprising:

a. an eccentric pivot bolt having a centre section between generally coaxial end sections with at least one of said end sections being threaded, said centre section being larger in diameter than said end sections and having a centre section axis generally parallel to but non-coaxial with an axis of said end sections;

b. said centre section of said eccentric pivot bolt being receivable in a rigid centre tube of a bushing mounted in a passage extending transversely through said leading end of said trailing beam;

c. a first ratchet collar extending about and secured to one of said end sections, said first ratchet collar having a flange extending therefrom through said hanger sidewall to abut said centre tube, said flange being closely received in an opening in said sidewall which admits said eccentric pivot bolt;

d. a second ratchet collar rigidly secured to said eccentric pivot bolt, said second ratchet collar having a grippable portion associated therewith for facilitating rotation of said second ratchet collar along with said eccentric pivot bolt about said axis of said end section;

e. said first and second ratchet collars engaging each other to provide at least unidirectional rotation of said second ratchet collar relative to said first ratchet collar;

f. respective wear discs for extending about each of said end sections of said pivot bolt adjacent a face of said hanger, said wear discs extending about said centre tube;
g. a hanger side reinforcement extending about the other of said end sections and sized to abut against said centre tube; and,
h. a nut threadedly engaging the other of said end sections for acting against said hanger side reinforcement to urge said first and second ratchet collars toward each other to secure said first and second ratchet collars and in turn, said eccentric pivot bolt against rotation.

2. The apparatus of claim 1 further comprising at least one spring mounted between said nut and said hanger side reinforcement.

3. The apparatus of claim 2 further comprising a washer mounted between said nut and said spring.

4. The apparatus of claim 3 wherein each of said at least one spring is a disc spring.

5. The apparatus of claim 4 wherein said grippable portion is a nut welded to said second ratchet collar and to said one of said end sections.

6. The apparatus of claim 1 wherein said centre tube of said bushing is surrounded by a resilient material to provide cushioning between said hanger and said beam.

7. The apparatus of claim 1 wherein said first and second ratchet collars have teeth which mesh with each other and which are profiled to cause unidirectional rotation corresponding with a tightening direction of said nut to restrain said ratchet collars from moving relative to each other in such a manner as to cause loosening of the components of the apparatus.

* * * * *